United States Patent [19]
Mary et al.

[11] Patent Number: 5,347,315
[45] Date of Patent: Sep. 13, 1994

[54] MODULAR ENCODER FOR GENERATING A DIGITAL MULTIPLEX SIGNAL AND DECODER FOR PROCESSING SUCH A SIGNAL

[75] Inventors: Jean Mary, Orsay; Jean-Michel Masson, Courson Monteloup, both of France

[73] Assignee: Matra Communication, France

[21] Appl. No.: 3,496

[22] Filed: Jan. 12, 1993

[30] Foreign Application Priority Data

Jan. 16, 1992 [FR] France .................................. 92 00408

[51] Int. Cl.⁵ ............................................. H04N 7/08
[52] U.S. Cl. .................... 348/473; 348/489; 348/463; 348/467; 370/82
[58] Field of Search ............ 358/146, 142, 141, 12, 358/13; 370/80, 85.6, 82, 94.1, 61, 112; 348/473, 474, 489, 488, 472, 471, 469, 463, 467, 432, 385, 386; H04N 7/08, 7/087, 7/00, 7/13

[56] References Cited

U.S. PATENT DOCUMENTS

| | | | |
|---|---|---|---|
| 4,665,427 | 5/1987 | Beckley et al. | 358/12 X |
| 4,706,109 | 11/1987 | Murray | 358/12 |
| 4,748,619 | 5/1988 | Vigarie et al. | 370/94.1 |
| 4,757,498 | 7/1988 | Murray | 370/94.1 |
| 4,891,805 | 1/1990 | Fallin | 370/80 X |
| 5,280,479 | 1/1994 | Mary | 370/85.6 |

FOREIGN PATENT DOCUMENTS 0461978  6/1991  European Pat. Off. ........ H04N 7/00

OTHER PUBLICATIONS

S.M.P.T.E. Journal, vol. 97, Aug. 8, 1988, White Plains U.S.A. pp. 606-612; Dalton et al: "Communications between analog component production centers" p. 610, Col. 2-Col.3, line 25;Fig.5.

Symposium Record Broadcast Sessions, Jun. 17, 1989, Montreux, pp. 701-707; Hascoet et al.: "T-MAC: Contribution links with analog component quality" p. 704, line 14-p. 705, Figs. 3,4.

*Primary Examiner*—James J. Groody
*Assistant Examiner*—Safet Metjahic
*Attorney, Agent, or Firm*—Larson and Taylor

[57] ABSTRACT

A X-MAC encoder enables a plurality of components to be encoded, each having a sequence of packets, with the packets being distributed in successive bursts each occupying a predetermined fraction of a television frame line. It comprises a plurality of blocks each having at least one packet encoder provided with a buffer memory for storing digital data coming from a source, and an encoder for distributing the packets in bursts of adjustable duration not greater than the duration of one television line. A base encoder assembly contains a programmable device for allocating a determined window of the television frame to each block. It calls a burst of length corresponding to the width within the window that is allocated by the programmable device, on the basis of the respective block burst encoder, at the beginning of each window in a line.

9 Claims, 3 Drawing Sheets

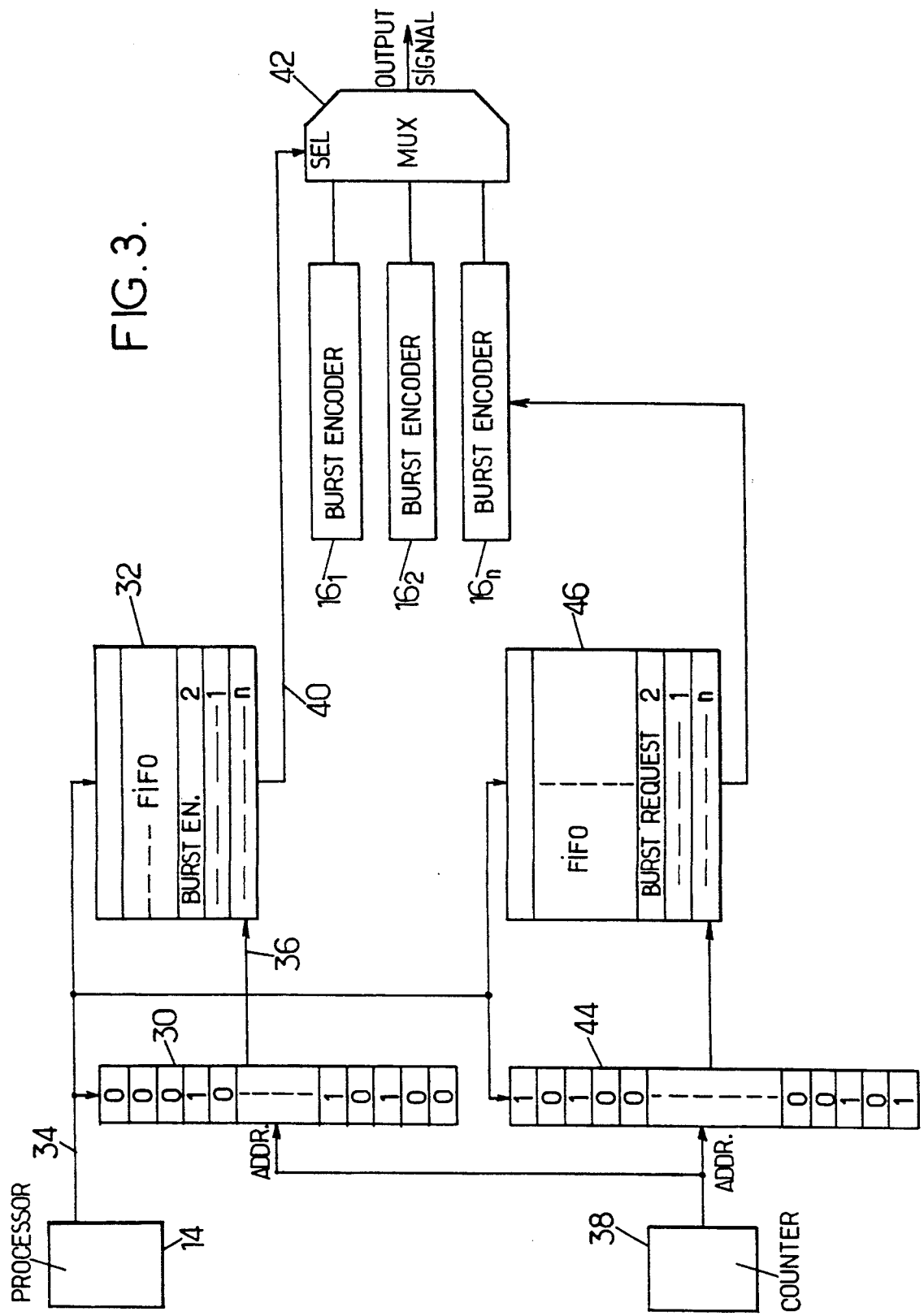

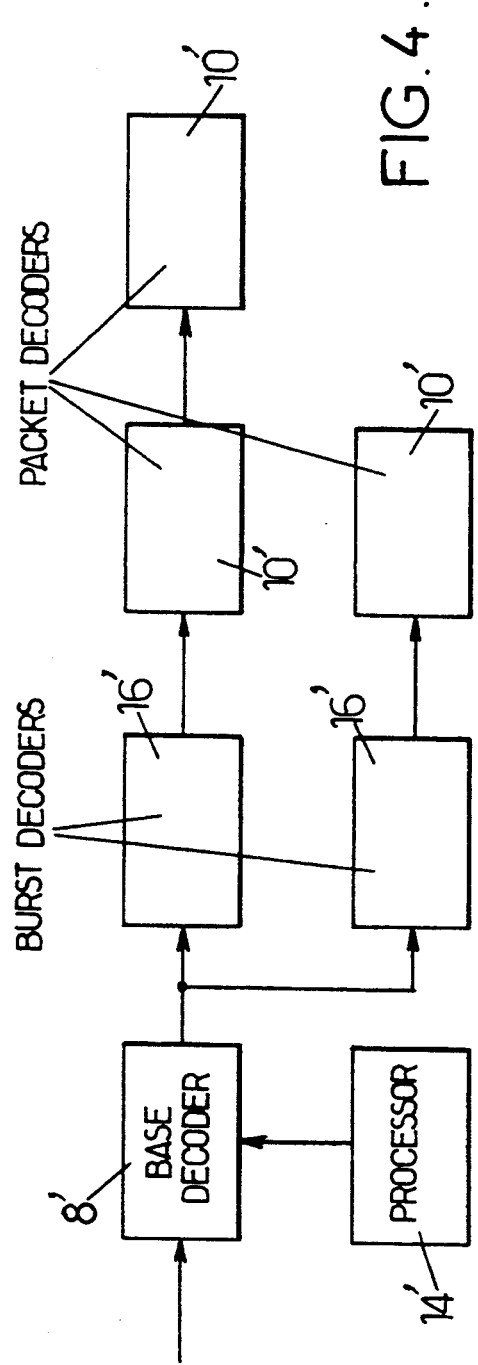

MODULAR ENCODER FOR GENERATING A DIGITAL MULTIPLEX SIGNAL AND DECODER FOR PROCESSING SUCH A SIGNAL

BACKGROUND OF THE INVENTION

The present invention relates to a multicomponent encoder suitable for making up a multiplex that may be referred to as a "X-PACKET" multiplex (where this term covers structures known under the names D2 MAC, DMAC, full time D2, full time D, and HD-MAC), each component comprising a sequence of packets and the packets being distributed in successive bursts each occupying a predetermined fraction of a TV frame line, said fraction lying anywhere in the range 0/1 to 1/1 and to a corresponding multicomponent decoder. The term "digital components" is used herein to designate all of the data from a source where the data is identified by a window in the frame: a sequence of bursts is an example of digital component.

A particularly important application of the invention lies in providing an encoder enabling a full time D2 or D type digital multiplex to be made up with the fraction of each component possibly extending up to the entire time allocated to active lines. An important complementary application lies in providing a decoder, particular a community decoder, enabling such a broadcast signal to be processed and distributed amongst subscriber lines.

Such a multiplex, and in particular a full time multiplex, must be adaptable to the needs of the broadcaster and to its program suppliers. Such needs may change. The number of sources to be broadcast may be increased, thereby increasing complexity. To make optimum use of resources, it is necessary that the time fractions allocated to different sources be easily changed.

SUMMARY OF THE INVENTION

It is an object of the invention to provide an improved encoder. It is a further object to provide an encoder easily modified for increased complexity in order to accept a larger number of sources, with this being done merely by adding components, without altering stored instructions and without changing pre-existing equipment.

To this end, there is provided an X-packet modular encoder comprising a plurality of blocks each having at least one packet encoder provided with a buffer memory for storing digital data coming from a source, and a burst encoder for distributing packets in bursts of adjustable duration not greater than the duration of one television line and a base coder assembly. The base coder assembly may contain a programmable device for allocating a predetermined window of the television frame to each block and means for calling a burst of length corresponding to the width within the window that is allocated by the programmable device, from the burst encoder of the respective block, at the beginning of each window in a line.

For convenience, the term "burst" is used to designate the set of data called from a given block for insertion into one line, and the term "sequence of bursts" is used to designate all bursts delivered by the burst encoder of a block in the entire window allocated to said encoder. The term "digital components" is used to designate all of the data from a source which are identified by a window in the frame (a sequence of bursts is an example of a digital component).

The digital data may be representative of any kind of information such as: sound, video, test signals, teletext data etc.

The structure of a decoder may be considered as being symmetrical to the structure of the above-defined encoder.

Another object of the invention is to provide an encoder (or a decoder) of the kind defined above that is easily reprogrammed, where reprogramming may include altering windows in each new frame. For that purpose an encoder (or a decoder) includes a processor enabling bursts to be altered responsive to input data constituted by:

the identity of characteristic sample (or bit) numbers at which window change, consequently block switching, takes place, in any line;

the identity of characteristic line numbers in which block distribution is modified.

This solution makes rapid reconfiguration possible and it requires only a small volume of information to be stored in comparison with a solution which would consist in storing distribution between bursts for all of the lines of the television frame.

The invention will be better understood from the following description of encoders and decoders that constitute particular embodiments thereof and that are given as non-limiting examples. The description refers to the accompanying drawings.

BRIEF DESCRIPTION OF THE DRAWINGS

FIG. 3 is a block diagram showing an advantageous structure for a base encoder corresponding to the diagram of FIG. 2; and FIG. 4 is a block diagram of a decoder suitable for decoding a signal as delivered by the encoder of FIG. 2.

DETAILED DESCRIPTION OF EMBODIMENTS

The invention will now be described in its application to full time digital transmission in a frame which, in compliance with the D2 MAC/packet standard, has 625 lines, with line 625 being intended for message transmission purposes. However, whereas during regular broadcast of D2 MAC television programs each active line includes a digital burst of 99 bits in addition to the analogue MAC portion, in full time digital broadcasting or transmission each line only comprises 1,296 digital samples, i.e. 648 bits when in duobinary code. In most cases, the data from a same source is transmitted in packets of 751 bits that are distributed in bursts whose allocations can be indicated by data included in line 625 of the TV frame.

Figure 1:
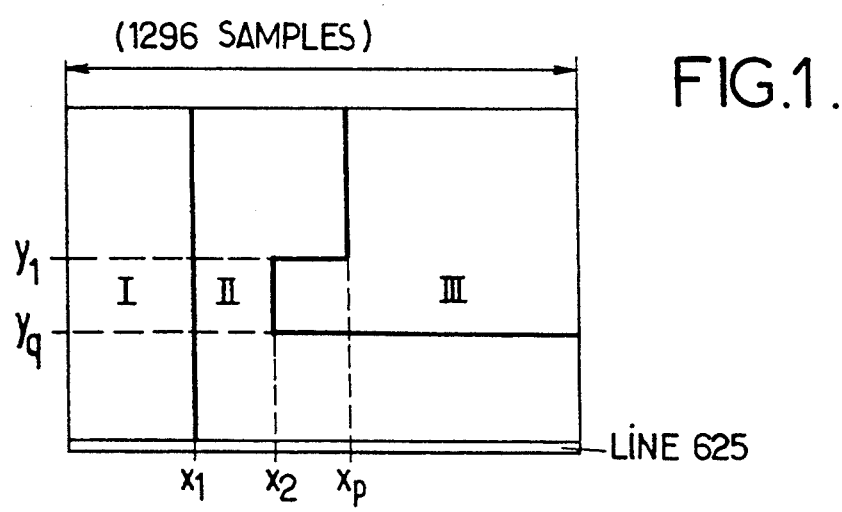
FIG. 1 shows one possible arrangement a D2 MAC/-packet television frame having full time transmission of three sequences of bursts.

In the example given in FIG. 1, the frame is made up of three sequences of bursts occupying three windows respectively indicated I, II and III. Each line contains 1 to 3 bursts. Each sample number at which a change takes place on any line in the frame from one burst to another is referred to below as a "characteristic sample number".

Figure 2:
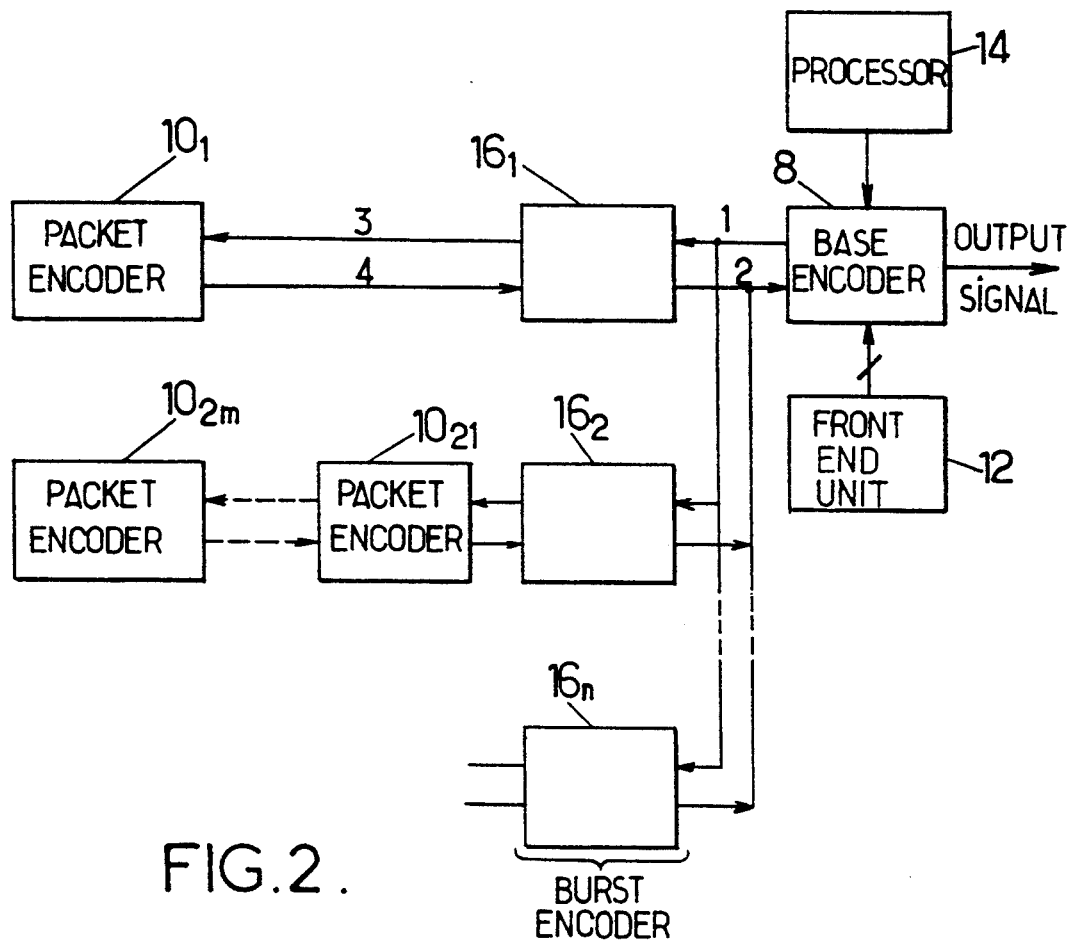
FIG. 2 is a block diagram of a multicomponent encoder suitable for generating up a frame of the kind shown in FIG. 1.

Regardless of the number of sequences of bursts, the multicomponent coder for making up the frame comprises a base encoder assembly which constitutes the master element of the encoder, with said base encoder assembly being the only element used when only one sequence of bursts is to be broadcast or transmitted, which sequence is made up of packets coming from a single packet encoder $10_1$ in the diagram of FIG. 2.

The base encoder 8 receives transmission instructions from a front end unit 12 which itself includes a memory storing the structure of the frame to be made up. These instructions are used by a processor 14.

The base encoder 8—which together with the front end unit 12 constitutes a base assembly—delivers signals to burst encoders $16_1, 16_2, \ldots 16_n$ (whose number may vary) as requests for bursts each containing a number of bits that depends on the window (I, II and III in FIG. 1) allocated to a block to which the respective burst encoder belongs. Each burst encoder constitutes the output unit of the corresponding block.

The burst encoder to which the request is directed (signal 1 in FIG. 2) responds by sending M bits to be inserted (signal 2) to the base encoder 8. The base encoder 8 is designed to add synchronizing and blanking signals to each line and/or frame, in compliance with the standard in use and also to add the indications provided by the front end unit 12 in line 625. With full time D-packet, it is thus possible to identify up to 12 sequences of bursts, i.e. 12 digital components and 12 windows.

The first block shown in FIG. 2 comprises a single packet encoder $10_1$ which is slaved to the corresponding burst encoder $16_1$. It is designed to deliver a packet of bits (signal 4) in response to a transmission request (signal 3) from the burst encoder $16_1$. The packet encoder $10_1$ receives the data to be transmitted from a source. It has an input memory organized as a queue, i.e. having first-in, first-out (FIFO) behavior, enabling the data to be formated in packets, and an output memory enabling the packets making up a burst to be sent to the burst encoder, the packets being made up of the requested number of bits x.

The multicomponent encoder includes as many burst encoders as there are burst sequences, i.e. windows (three in the example of FIG. 1).

A block may include a plurality of packet encoders, each being allocated to a source. For example, the second block as shown comprises packet encoders $10_{21}, \ldots, 10_{2m}$. They may be associated in cascade, with each packet encoder being a slave to the preceding encoder and a master to the following encoder, and with each packet request being transmitted until it encounters an encoder having packets to be transmitted. It is also possible to organize the encoders so that it is the encoder having the highest priority source that emits a packet in response to a request, e.g. by implementing the method described in French patent No. 91 07443 or U.S. Pat. No. 5,280,479 (Mary) to which reference may be made.

A decoder for recovering all packets included in the multiplex may have a structure symmetrical to that of the encoder and thus, as shown in FIG. 4, include a base decoder 8' including an input from a processor 14', burst decoders 16' and packet decoders 10'. While the decoder is illustrated in FIG. 4, it will be described with further reference to FIG. 2 as well. However, in this case, references 8; 16' and 10' in FIG. 4 respectively designate a basic decoder (always present), burst decoders (there being the same number of burst decoders as there are digital components or windows, and packet decoders.

The base decoder 8 is again the master element. It sends the bursts to be processed to the burst decoders 16 (signal 1 in FIG. 2) and these devices respond by sending an acknowledge signal (signal 2). The base decoder 8' distributes the different bursts in compliance with the arrangement up of the input digital multiplex it receives (as described in line 625 of the TV frame).

Each burst decoder 16' operates as a slave to the base decoder 8' and as a master to the associated package decoder(s) 10'. It makes up packets as it receives data of a burst being processed, and it sends such packet (signal 3) to the packet decoders. In response to a received packet, the respective packet decoder returns an acknowledge signal (signal 4) to the burst decoder. A buffer memory is provided at the output of the burst decoder (or at the input of the packet decoder) in order to enable the packet decoder to act on complete packets only, as reconstructed from a plurality of bursts all belonging to the same sequence of bursts.

It is frequently preferable to locate the memory at the output of the burst decoder: in this way, each packet delivered by the burst decoder is accompanied with an address, thus making it possible for each packet decoder when a plurality of packet decoders are present, to determine whether the packet is addressed to it and must be processed, or on the contrary, whether it should merely be passed on to the following decoder.

The dialogue between two packet decoders (associated with the same burst decoder) may be identical to the dialogue between the burst decoder and the first packet decoder.

As shown in FIG. 1, the length of position of windows (i.e. digital components) in a same given frame may vary from one line to another. Furthermore, it is generally necessary periodically to modify the way in which windows are allocated, possibly once per frame.

The fractionation may be defined by storing, for each line, the number or location of the samples where switching occurs from one digital component to another. Then a large memory capacity is required if the configuration is complex.

Referring to FIG. 3, in a preferred embodiment of the invention, the base encoder comprises a processor that enables the operation of the encoder to be managed in such a manner as to make real time reconfiguration possible while requiring a small amount of memory and a simple processor for delivering control signals.

Operation of the encoder requires "characteristic sample numbers" $(x_0, x_1, \ldots x_p)$ to be defined in the frame wherever component switching (i.e., for example, change from one burst to another) takes place in any line, together with "characteristic line numbers" $Y_1, \ldots, Y_q$, e.g. the lines where burst distribution changes.

It is then possible, for all characteristic lines, to store the succession of characteristic codes for each digital component, thereby making it possible to reconstitute the distribution within each line since:

in each line the code may only change on a characteristic sample; and the distribution stored in a characteristic line remains unchanged up to the following characteristic line.

In general, the base encoder may include two branches of comparable structure. One of the branches is for selecting the digital components to be inserted into the frame. The second branch is for generating codes representative of requests for digital components.

In the embodiment shown in FIG. 3, the first branch comprises a read/write or RAM memory 30 for storing the characteristic sample numbers $x_1, \ldots, x_p$. This memory typically has a number of addressable binary locations equal to the number of samples in each line (e.g. 1,296 in full time digital transmission). Locations in the memory 30 having addresses that correspond to characteristic sample numbers are put into an active binary state (e.g. 1) by writing from bus 34 of the processor-front end unit assembly. The branch includes a second memory 32, organized as a FIFO, in which the digital component identification codes are stored by the bus, in the same order as in the frame, and solely for one characteristic line at a time. The codes given by way of example in FIG. 3 are "burst enable" codes. An input 36 of the FIFO 32 receives a signal from RAM memory 30 when said memory is addressed for read out by the number of a characteristic sample coming from a sample counter 38 which is reset to zero at the beginning of each line. Each signal advances the queue 32 by one location and it causes the code for selecting a digital component to be emitted on the output 40. This code is applied to the selection input of a multiplexer 42.

The FIFO 32 is looped back so as to pass through all of the characteristic line codes until a new characteristic line occurs.

At each occurrence of a characteristic line, the bus 34 loads a new distribution. In practice, the FIFO is advantageously made up and controlled in such a manner as to ensure that it always stores the codes present in the next line to arrive.

The second branch includes a read/write or RAM memory 44 organized similarly to RAM 30. Characteristic lines of the digital component request codes are written into this memory via the bus 34. It also includes a FIFO 46 into which the bus of the processor 34 loads request codes, e.g. codes which each designate that burst encoder which is to provide a burst. The output from each burst encoder is applied to a respective data input of the multiplexer 42.

The structure, control and arrangement of the conventional components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. Multi conductor busses are represented as single lines and power supply terminals and leads have been omitted for clarity.

We claim:

1. An encoder for generating a multiplex signal having a plurality of components, each said component comprising a sequence of packets of digital samples and the packets being distributed in successive bursts each occupying a determined fraction of a line of a television frame, said encoder comprising:
   a plurality of blocks each having
      at least one packet encoder provided with a buffer memory for storing digital data coming from a respective source, and
      encoder means for fractionating said successive packets delivered by said packet encoder and distributing the fractionated packets in bursts each having an adjustable duration not greater than the duration of one line of a television frame; and
   a base encoder assembly containing a programmable device for allocating a predetermined and adjustable window, consisting of length portions of some at least one successive lines in the television frame to each block and means for calling a burst of length corresponding to that length portion of the line which is within the window allocated by the programmable device, from the encoder means of the respective block, at the beginning of each said window in one line.

2. An encoder according to claim 1, wherein at least some of the blocks include a plurality of said packet encoders connected in series relation, each said packet encoder having a priority identification, and the respective encoder means are designed so that the packet encoder having the highest priority emits data toward the encoder means.

3. An encoder according to claim 1, wherein each said base encoder assembly is distributed to add, in each said frame, synchronization and blanking signals in compliance with an X-packet standard, and to insert burst identification indications into line 625 of the television frame.

4. An encoder according to claim 1, further including a processor enabling the organization of bursts to be altered responsive to input data constituted by:
   a identity of characteristic sample numbers in which block switching takes place, in any one of the lines;
   a identity of characteristic line numbers in which an alteration in block distribution occurs.

5. An encoder according to claim 4, wherein the base encoder includes two branches, one of which is constituted to select the digital component for which a burst is to be sent and the second of which is constituted to generate codes representative of burst requests identifying appropriate ones of said encoder means.

6. An encoder according to claim 5, wherein said one of said branches includes a read/write memory for storing said characteristic sample numbers, having a number of addressable binary locations that is at least equal to the number of samples in each line, and a FIFO in which said codes are stored in burst order from an external processor, solely for one characteristic line at a time, the FIFO receiving an output signal from the respective memory when said memory reads the address of a characteristic sample number from a sample counter.

7. An encoder according to claim 5, wherein the second branch includes a read/write memory in which the characteristic sample numbers of burst request codes are stored via a bus, and a FIFO in which the processor bus stores request codes identifying the burst encoder that is to provide a burst.

8. A decoder for splitting up a multiplex signal consisting of packets originating from a plurality of sources each of which supplies a sequence of packets that are distributed in successive bursts, each occupying a predetermined and adjustable fraction of a line in a television frame, said decoder comprising:
   a base decoder assembly containing a programmable memory for determining controllable identifying windows in the television frame each allocated to one respective said sequence and containing means for programming said programmable memory responsive to data in said multiplex signal indicating characteristic line numbers and sample numbers in said characteristic lines where there is a change from one said window to another said window; and a plurality of blocks each connected to a respective one of said output and each having at least one burst decoder operating as a slave to the base decoder assembly and as a master to at least one packet decoder attached thereto.

9. An encoder for generating a fully digital multiplex signal occupying a frame of a television type signal, and having a plurality of components, each said component comprising a sequence of packets of digital samples and the packets being distributed in successive bursts each occupying a determined fraction of a line of a television frame, said encoder comprising:

a plurality of blocks each having at least one packet encoder provided with a buffer memory for storing digital data delivered by a respective source, and encoder means for fractionating said successive packets delivered by said packet encoder into bursts each having an adjustable duration not greater than the duration of one line; and a base encoder assembly containing a programmable device for allocating a predetermined and adjustable window in the television frame to each block and means for calling a burst of length corresponding to that portion of the line which is within the window that is allocated by the programmable device, from the encoder means of the respective block, at the beginning of each window in one line and for inserting data in said multiplex signal which identify characteristic sample numbers at which a change from one window to another window occurs and identify numbers of characteristic lines in which a distribution of portions in the line between said windows is modified.

* * * * *